(12) United States Patent
Starr et al.

(10) Patent No.: US 9,579,685 B2
(45) Date of Patent: Feb. 28, 2017

(54) COUPLER FOR DECORATING BAG

(71) Applicant: Wilton Industries Inc., Woodridge, IL (US)

(72) Inventors: David Starr, Woodridge, IL (US); Jeff Bull, Woodridge, IL (US); Roy Melling, Woodridge, IL (US); Erin Smith, Woodridge, IL (US); Stephanie Goode, Woodridge, IL (US); Kevin McFadden, Woodridge, IL (US)

(73) Assignee: Wilton Industries, Inc., Woodridge, IL (US)

( * ) Notice: Subject to any disclaimer, the term of this patent is extended or adjusted under 35 U.S.C. 154(b) by 0 days.

(21) Appl. No.: 14/430,166

(22) PCT Filed: Feb. 21, 2013

(86) PCT No.: PCT/US2013/027156
§ 371 (c)(1),
(2) Date: Mar. 20, 2015

(87) PCT Pub. No.: WO2014/046719
PCT Pub. Date: Mar. 27, 2014

(65) Prior Publication Data
US 2015/0273516 A1 Oct. 1, 2015

Related U.S. Application Data

(60) Provisional application No. 61/704,208, filed on Sep. 21, 2012.

(51) Int. Cl.
*B05C 17/005* (2006.01)
*A23G 3/28* (2006.01)
(Continued)

(52) U.S. Cl.
CPC ....... *B05C 17/00506* (2013.01); *A21C 15/005* (2013.01); *A23G 3/28* (2013.01); *B67B 7/28* (2013.01)

(58) Field of Classification Search
CPC ... B05C 17/00506; B65D 77/065; B67B 7/26; B67B 7/28; A23G 3/28; A21C 15/005
See application file for complete search history.

(56) References Cited

U.S. PATENT DOCUMENTS 2,058,910 A * 10/1936 Plunkett .................. B67B 7/28
222/542
2,873,886 A * 2/1959 Miskel ................. B65D 51/222
222/522

(Continued)

FOREIGN PATENT DOCUMENTS

CN 1549678 A 11/2004
JP 05-039441 U 5/1993
(Continued)

OTHER PUBLICATIONS

International Search Report and Written Opinion for PCT Application No. PCT/US2013/027156, mailed Jun. 18, 2013, 13 pages.
(Continued)

*Primary Examiner* — Frederick C Nicolas
*Assistant Examiner* — Bob Zadeh
(74) *Attorney, Agent, or Firm* — Foley & Lardner LLP

(57) ABSTRACT

A coupler removably connectable to a decorating bag. The coupler includes an inner coupler configured to be inserted into the decorating bag, an outer coupler configured to removably secure to the inner coupler with the decorating bag disposed between the inner coupler and the outer coupler and a retainer configured to receive a decorating tip and removably secure to the outer coupler in order to lock the decorating tip into position.

18 Claims, 20 Drawing Sheets

(51) Int. Cl.
*A21C 15/00* (2006.01)
*B67B 7/86* (2006.01)

(56) References Cited

U.S. PATENT DOCUMENTS

| | | | | |
|---|---|---|---|---|
| 3,342,382 | A | * | 9/1967 | Huling .................. B05B 1/1645 |
| | | | | 222/402.17 |
| 3,402,855 | A | | 9/1968 | Schroeder et al. |
| 3,613,955 | A | | 10/1971 | Wetherell, Jr. |
| 3,767,085 | A | | 10/1973 | Cannon et al. |
| 3,768,697 | A | * | 10/1973 | Lerner ...................... B67B 7/26 |
| | | | | 222/80 |
| 3,922,099 | A | * | 11/1975 | Christine .................. A23G 3/28 |
| | | | | 222/107 |
| 3,995,773 | A | * | 12/1976 | Schmit .................. B65D 47/242 |
| | | | | 222/91 |
| 4,271,982 | A | * | 6/1981 | Niksich ................ B65D 47/248 |
| | | | | 222/501 |
| 4,355,737 | A | | 10/1982 | Pongrass et al. |
| 4,475,670 | A | | 10/1984 | Rutter |
| 4,538,920 | A | | 9/1985 | Drake |
| 4,562,940 | A | | 1/1986 | Asphar |
| 4,735,509 | A | | 4/1988 | Rausch |
| 4,981,241 | A | | 1/1991 | Keller |
| 5,033,650 | A | | 7/1991 | Colin et al. |
| 5,114,044 | A | | 5/1992 | Spanek |
| 5,152,432 | A | | 10/1992 | De Laforcade |
| 5,273,190 | A | | 12/1993 | Lund |
| 5,697,524 | A | | 12/1997 | Sedlmerier |
| 5,897,028 | A | | 4/1999 | Sauer |
| 6,012,610 | A | | 1/2000 | Pauser et al. |
| 6,065,651 | A | * | 5/2000 | Tedeschi, Jr. ...... B65D 41/3409 |
| | | | | 222/519 |
| 6,082,584 | A | * | 7/2000 | Stern .................. B65D 75/5877 |
| | | | | 222/107 |
| 6,193,108 | B1 | * | 2/2001 | Lepsius ............ B05C 17/00516 |
| | | | | 222/83 |
| 6,296,149 | B1 | | 10/2001 | Long |
| 6,409,972 | B1 | | 6/2002 | Chan |
| 6,439,427 | B2 | | 8/2002 | Long |
| 6,564,970 | B1 | * | 5/2003 | Walch ................ B05C 17/00516 |
| | | | | 222/327 |
| 6,659,994 | B1 | | 12/2003 | Mader et al. |
| 6,702,161 | B2 | | 3/2004 | Adams et al. |
| 6,874,657 | B2 | | 4/2005 | Metzner et al. |
| 7,337,923 | B2 | | 3/2008 | Niggemyer et al. |
| 7,762,439 | B2 | | 7/2010 | Niggemyer et al. |
| 8,056,748 | B2 | * | 11/2011 | Chen ...................... B65D 35/28 |
| | | | | 215/334 |
| 8,622,244 | B2 | | 1/2014 | Stoeckli et al. |
| 8,690,012 | B2 | | 4/2014 | Stoeckli et al. |
| 2003/0049179 | A1 | | 3/2003 | Snedden |
| 2003/0051610 | A1 | | 3/2003 | Dux et al. |
| 2003/0091702 | A1 | * | 5/2003 | Folkmar ............. A23G 3/2015 |
| | | | | 426/115 |
| 2004/0226968 | A1 | * | 11/2004 | Lafond ............. B05C 17/00506 |
| | | | | 222/327 |
| 2005/0085786 | A1 | | 4/2005 | Baessler et al. |
| 2008/0089967 | A1 | * | 4/2008 | Bourque ............. A23G 3/0021 |
| | | | | 425/183 |
| 2008/0287880 | A1 | | 11/2008 | Keller |
| 2015/0273516 | A1 | * | 10/2015 | Starr ....................... A23G 3/28 |
| | | | | 222/1 |

FOREIGN PATENT DOCUMENTS

| | | |
|---|---|---|
| JP | 2006-325560 | 12/2006 |
| JP | 4326503 B2 | 9/2009 |
| WO | WO03/020046 | 3/2003 |

OTHER PUBLICATIONS

Australian Office Action for Application No. 2013318607, dated Apr. 21, 2016, 3 pages.
First Office Action and Search Report for Chinese Application No. 201380060295.5, mail date Jun. 15, 2016, with English translation, 17 pages.
Supplementary Partial European Search Report for Application No. EP 13839232, mail date Sep. 16, 2016, 9 pages.

* cited by examiner

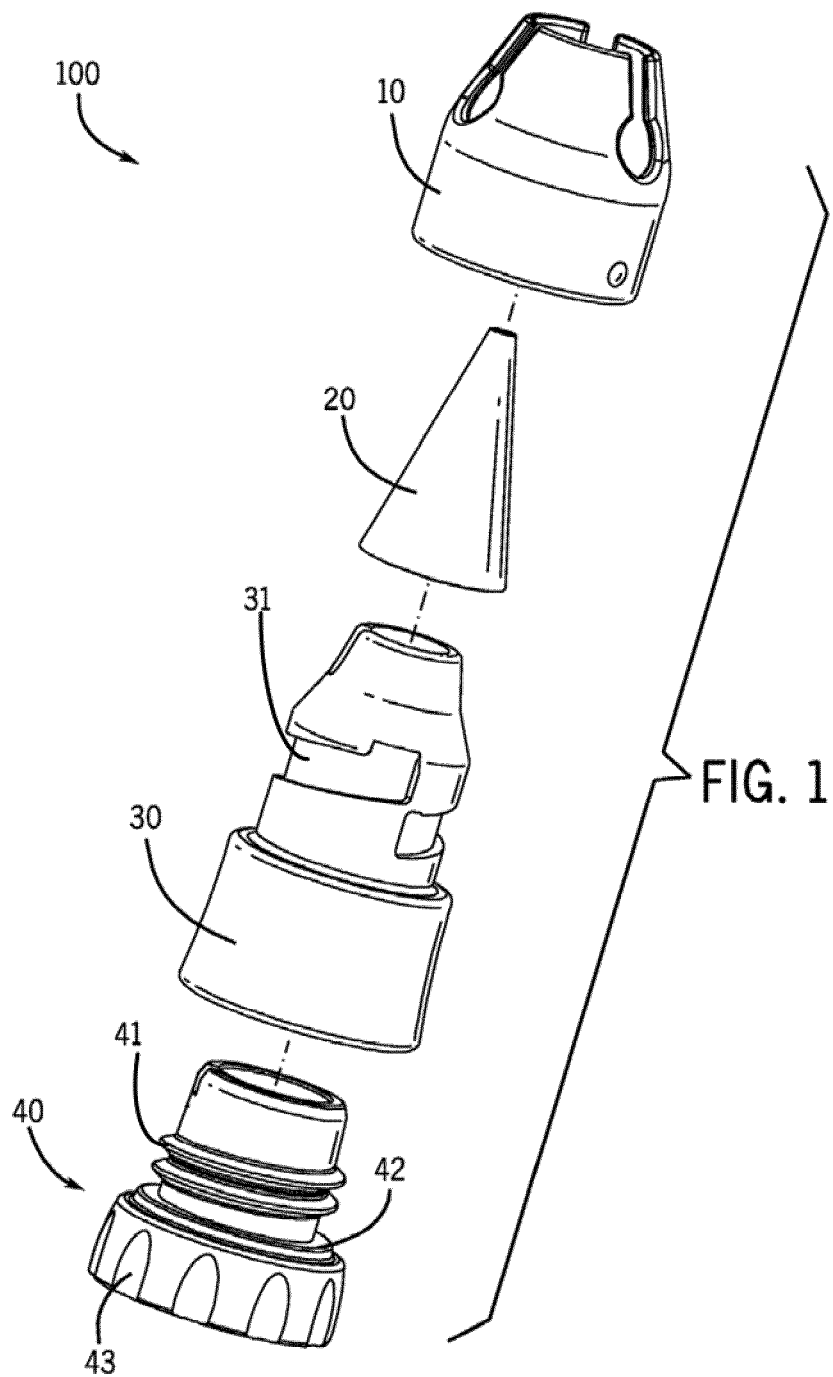

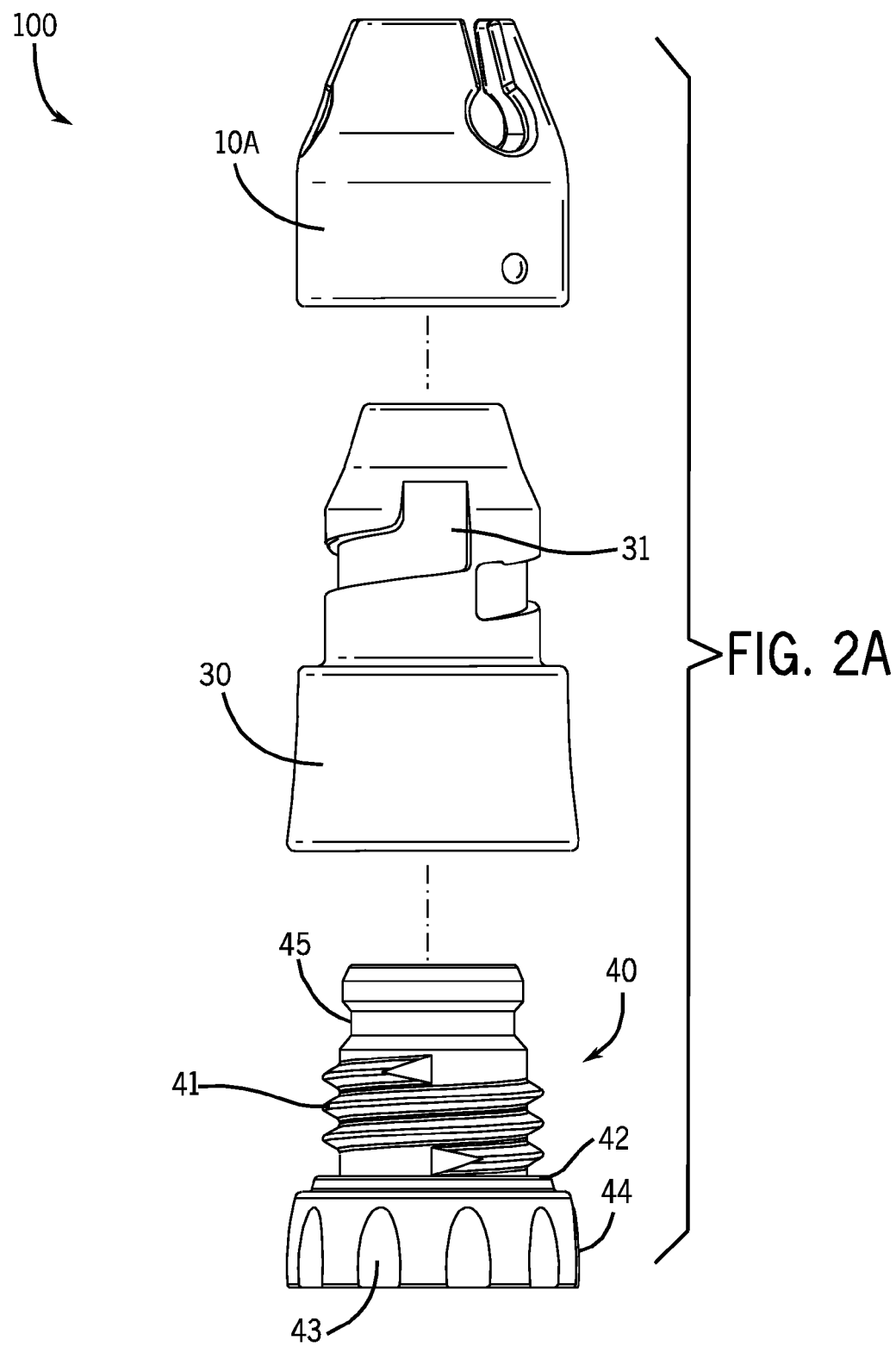

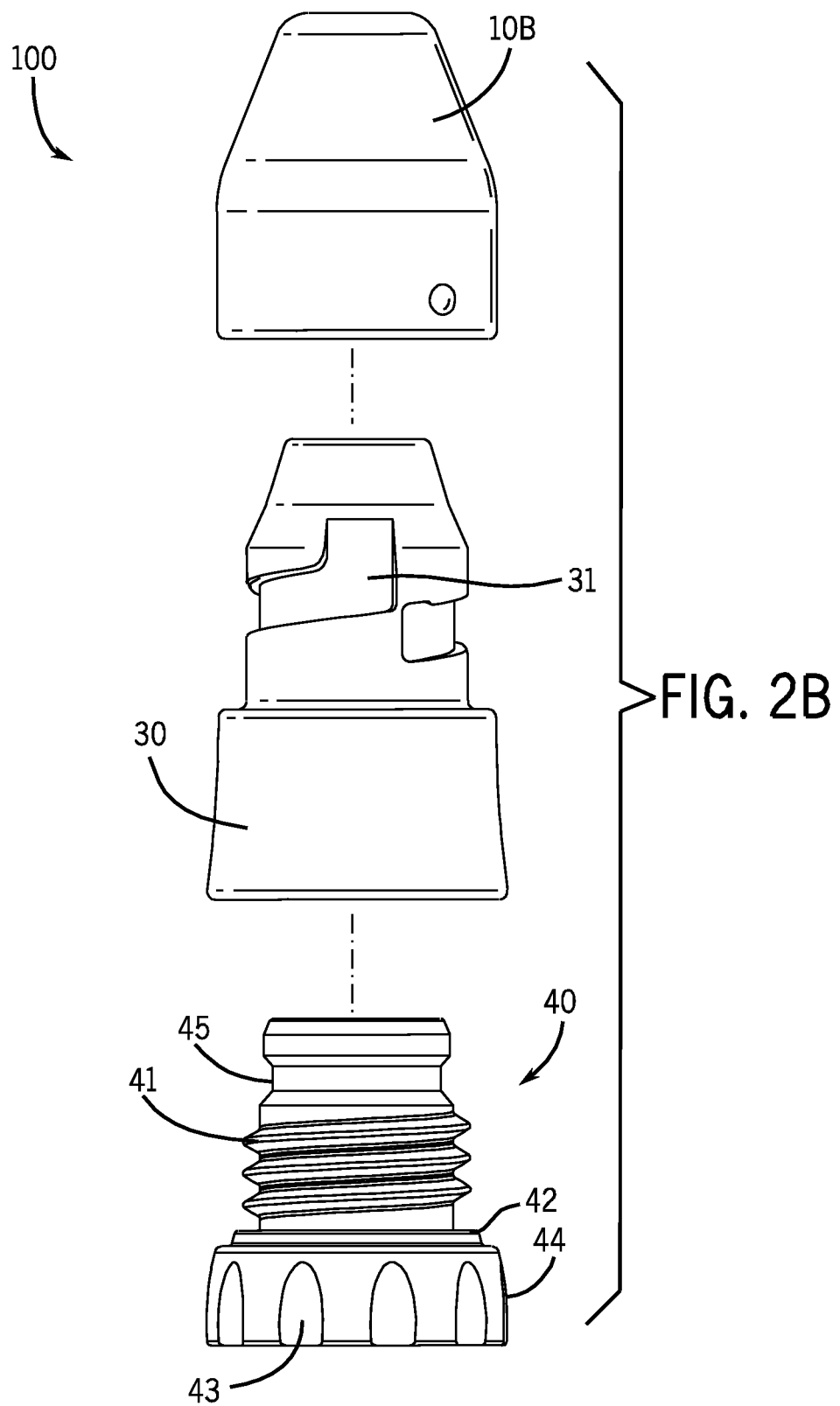

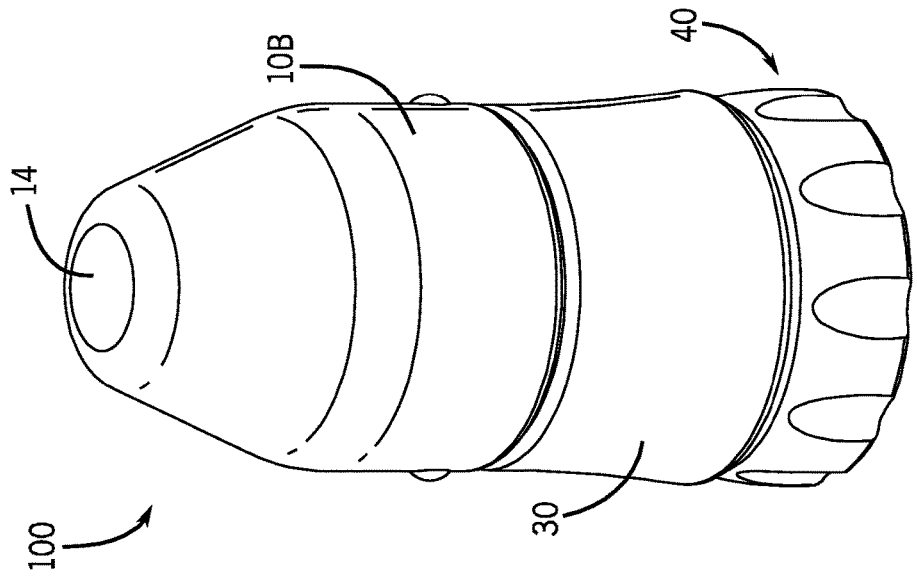
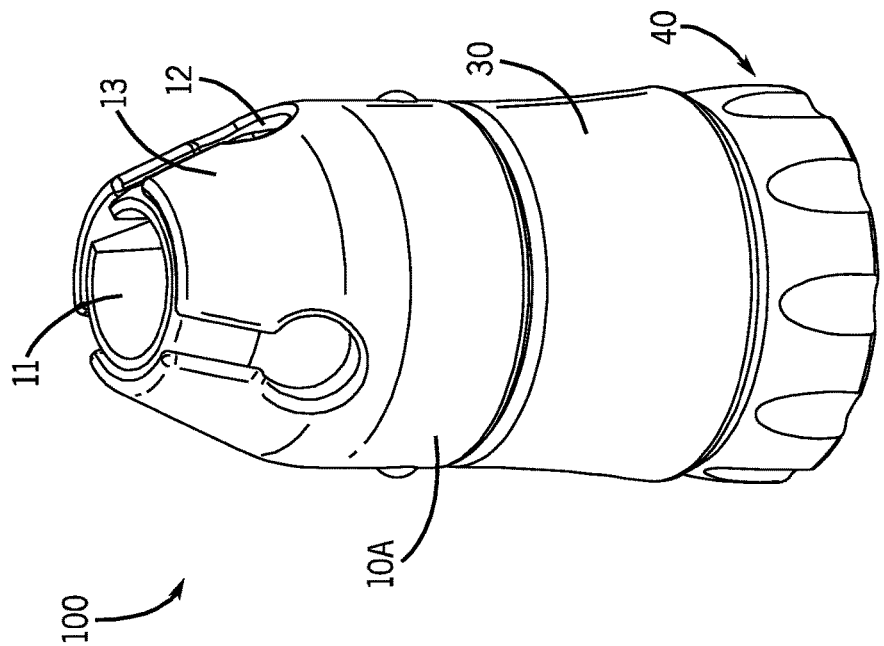
FIG. 3A
FIG. 3B

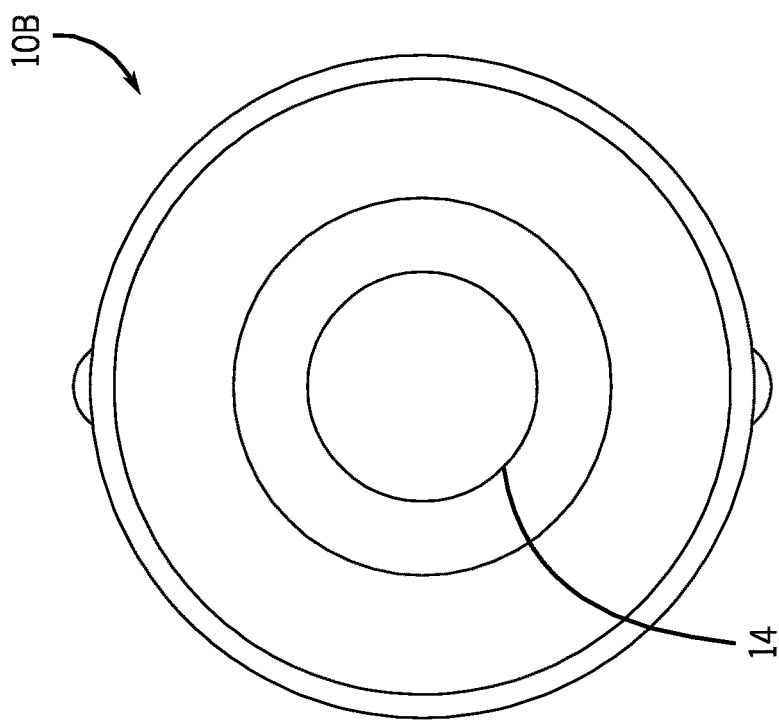
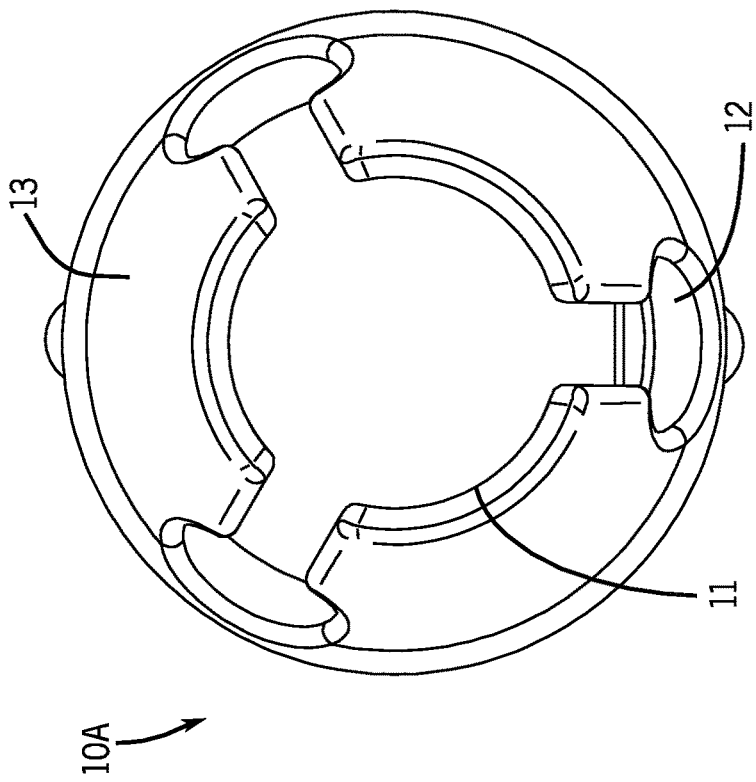

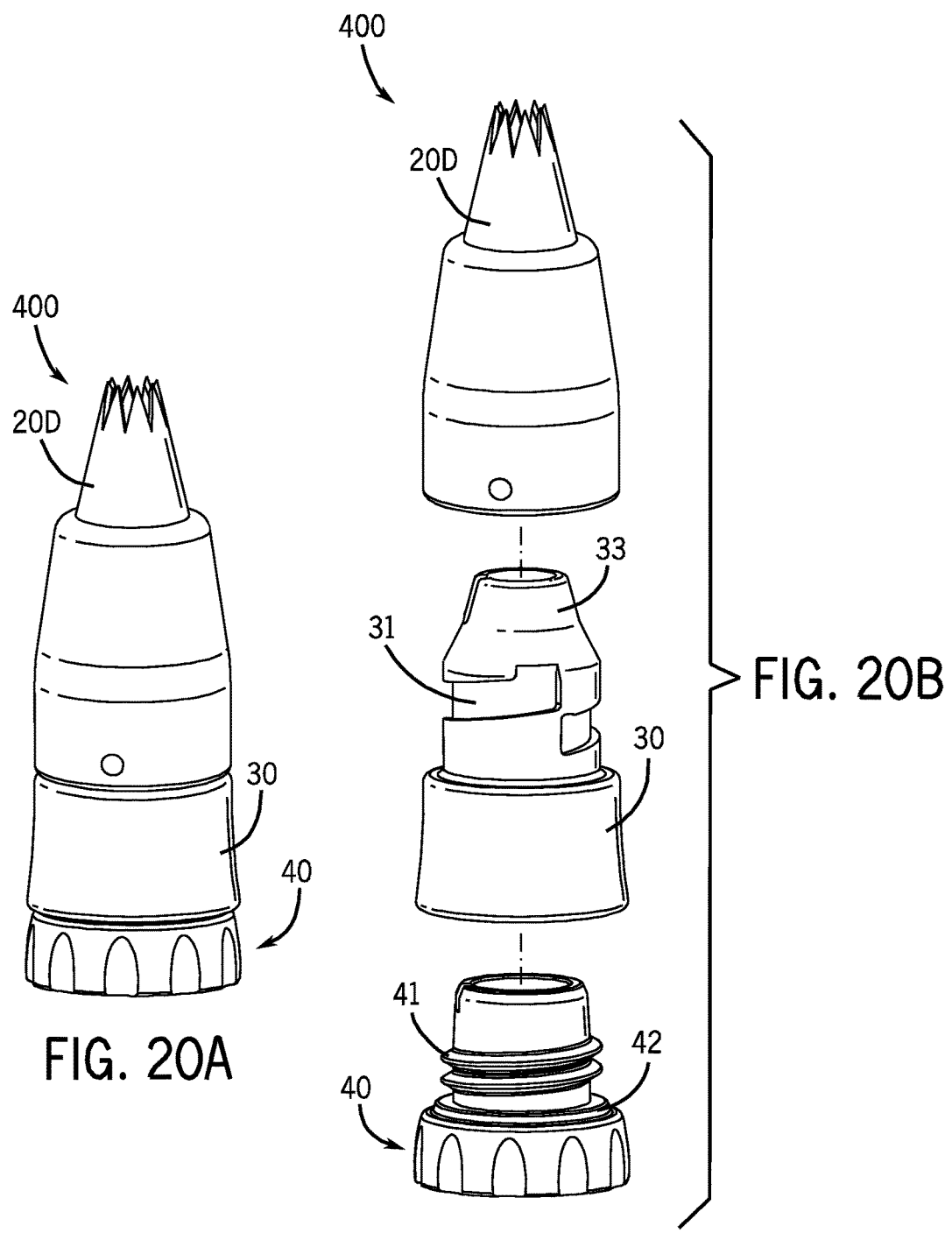

COUPLER FOR DECORATING BAG

RELATED APPLICATION

This application is a National Stage of International Application No. PCT/US2013/027156, filed Feb. 21, 2013, which claims priority from U.S. Provisional Application Ser. No. 61/704,208, filed Sep. 21, 2012, which is hereby incorporated by reference in its entirety.

BACKGROUND

The present application relates to systems and methods for decorating food products. Specifically, the present application relates to a coupler for a decorating bag.

Baked good decorators often utilize featherweight or disposable bags in the decorating process. The decorator fills the bag with a desired filling or icing and squeezes the filling or icing out of a decorating tip located at the end of the decorating bag. In some cases, the decorator selects a decorating tip, places the decorating tip into the decorating bag, cuts the end of the decorating bag open and fills the decorating bag with the desired filling or icing. In other cases, the decorator may make a parchment triangle, drop in a decorating tip and fill the parchment triangle with the desired filling or icing. In either case, it is a difficult and often messy process to change decorating tips. Thus, the decorator may attach a coupler to the end of the decorating bag to enable the decorator to change decorating tips without changing the decorating bag or making a mess with the filling or icing.

A problem with the current couplers is that the decorating bag must be cut in exactly the correct location for a coupler to be used. In addition, the current couplers have very fine threading, making it difficult to thread the coupler onto the decorating bag without cross threading a retainer that holds the decorating tip. The current couplers do not work well with very large or very small decorating tips. Furthermore, the coupler parts are small and difficult to grip with greasy hands. Moreover, decorating tips are not easy to swap out during use without a lot of mess. Also, it is a messy process to remove the current couplers from the bag after the decorating process is complete. Current couplers also require the use of special decorating tips, limiting their versatility for most users.

A need exists for improved technology, including technology that may address the above described disadvantage.

SUMMARY

One embodiment of the invention relates to a coupler removably connectable to a decorating bag. The coupler includes an inner coupler configured to be inserted into the decorating bag, an outer coupler configured to removably secure to the inner coupler with the decorating bag disposed between the inner coupler and the outer coupler and a retainer configured to receive a decorating tip and removably secure to the outer coupler in order to lock the decorating tip into position.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The accompanying drawings, which are included to provide further understanding of the invention, are incorporated in and constitute a part of this specification, illustrate embodiments of the present disclosure and together with the detailed description serve to explain the principles of the present disclosure. No attempt is made to show structural details of the present disclosure in more detail than may be necessary for a fundamental understanding of the present disclosure and the various ways in which it may be practiced.

FIG. 1 is an exploded view of an exemplary embodiment of a coupler for a decorating bag.

FIG. 2A is an exploded view of the coupler of FIG. 1 with a retainer configured to receive a decorating tip.

FIG. 2B is an exploded view of the coupler of FIG. 1 with a sealed retainer configured to prevent outflow of contents of the decorating bag when the decorating bag is not in use.

FIG. 3A is an isometric view of the coupler of FIG. 2A.

FIG. 3B is an isometric view of the coupler of FIG. 2B.

FIG. 4A is a top view of the coupler of FIG. 2A.

FIG. 4B is a top view of the coupler of FIG. 2B.

FIG. 20A is an isometric view another exemplary embodiment of a coupler for a decorating bag equipped with a fluted tip.

FIG. 20B is an exploded view of the coupler of FIG. 20A.

DETAILED DESCRIPTION

Figure 5B:
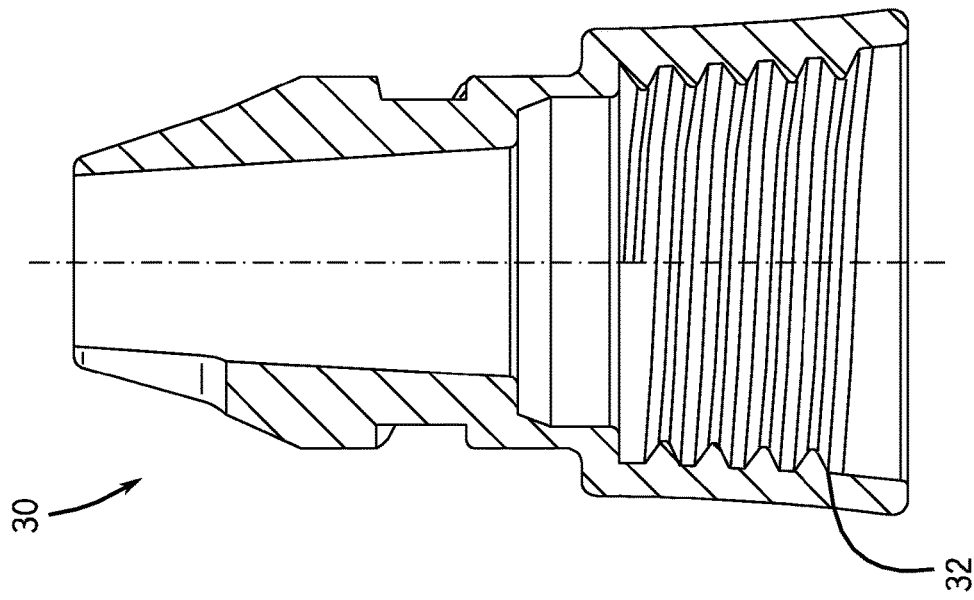
FIG. 5B is a cross sectional view of the outer coupler of FIG. 5A through line C-C.
Figure 5A:
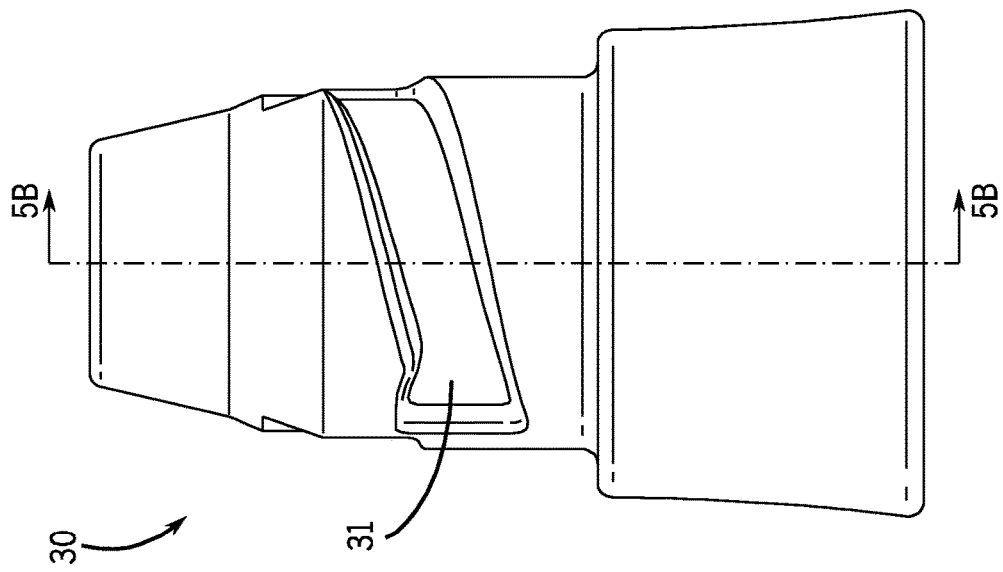
FIG. 5A is a side view of an outer coupler of the coupler of FIG. 1.
Figure 6:
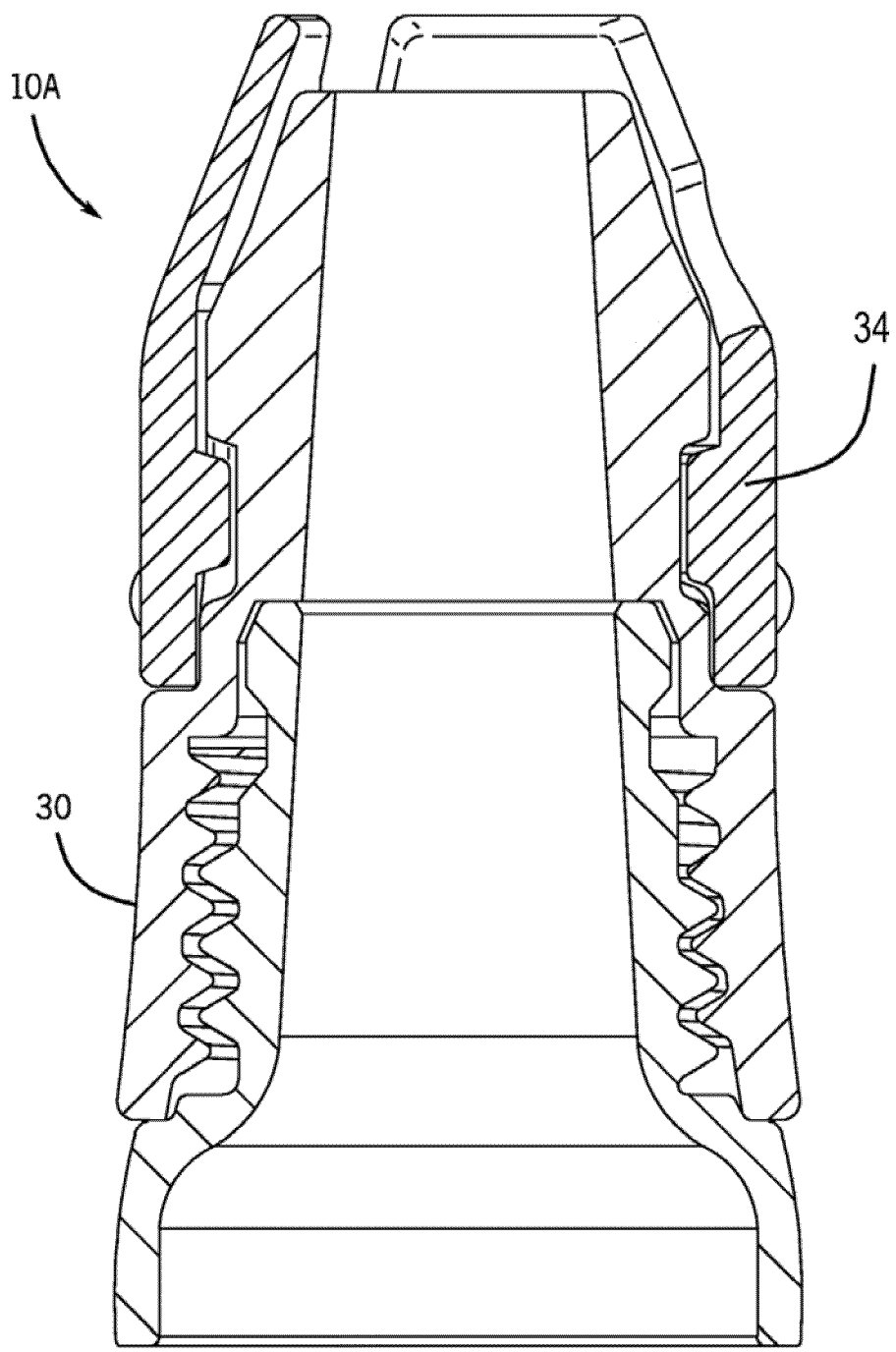
FIG. 6 is a cross sectional view of the retainer attached to the outer coupler of FIG. 5A including fingers of the retainer.
Figure 7:
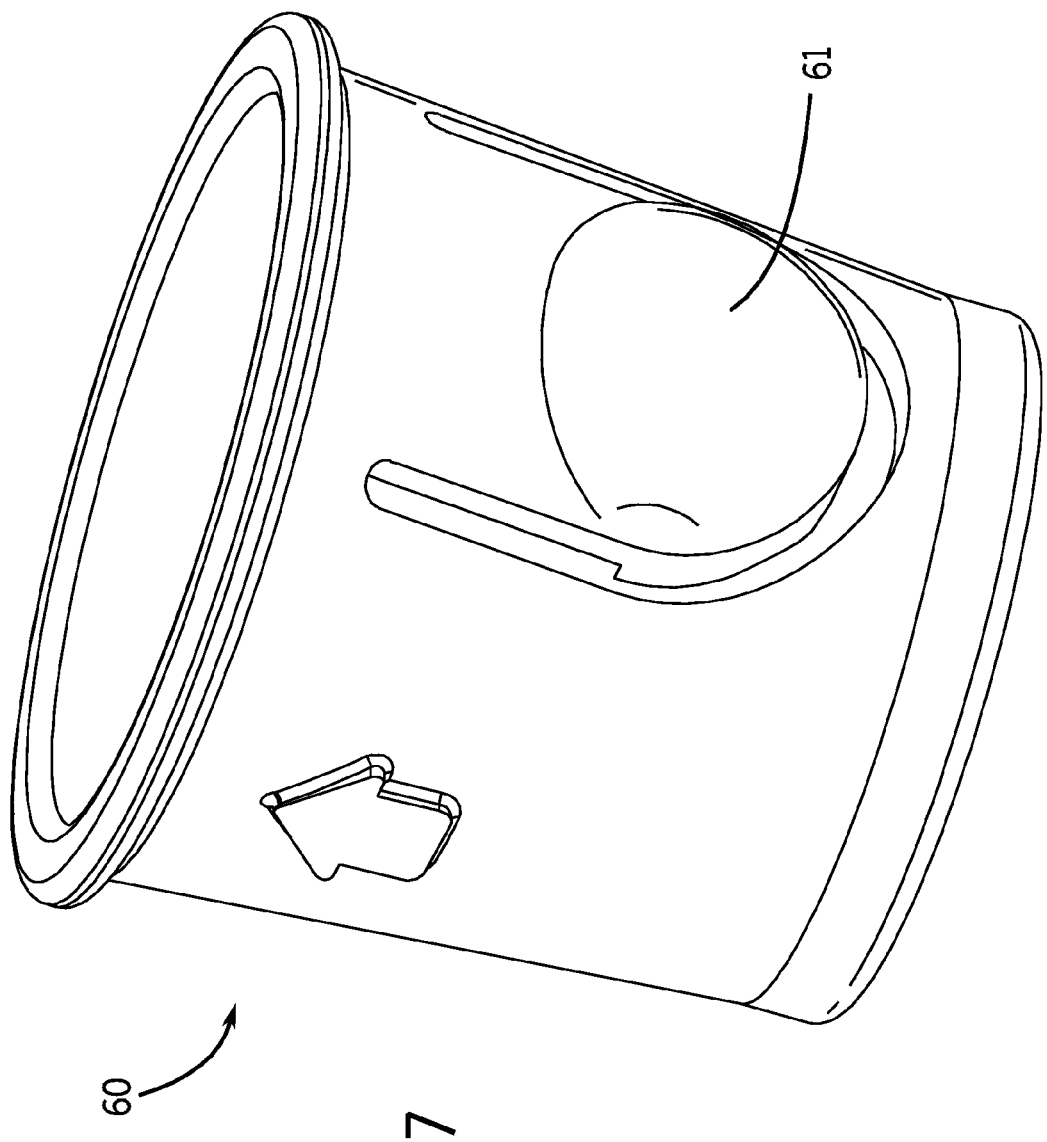
FIG. 7 is an isometric view of a bag cutter to be used in conjunction with an inner coupler of the coupler of FIG. 1.
Figure 8:
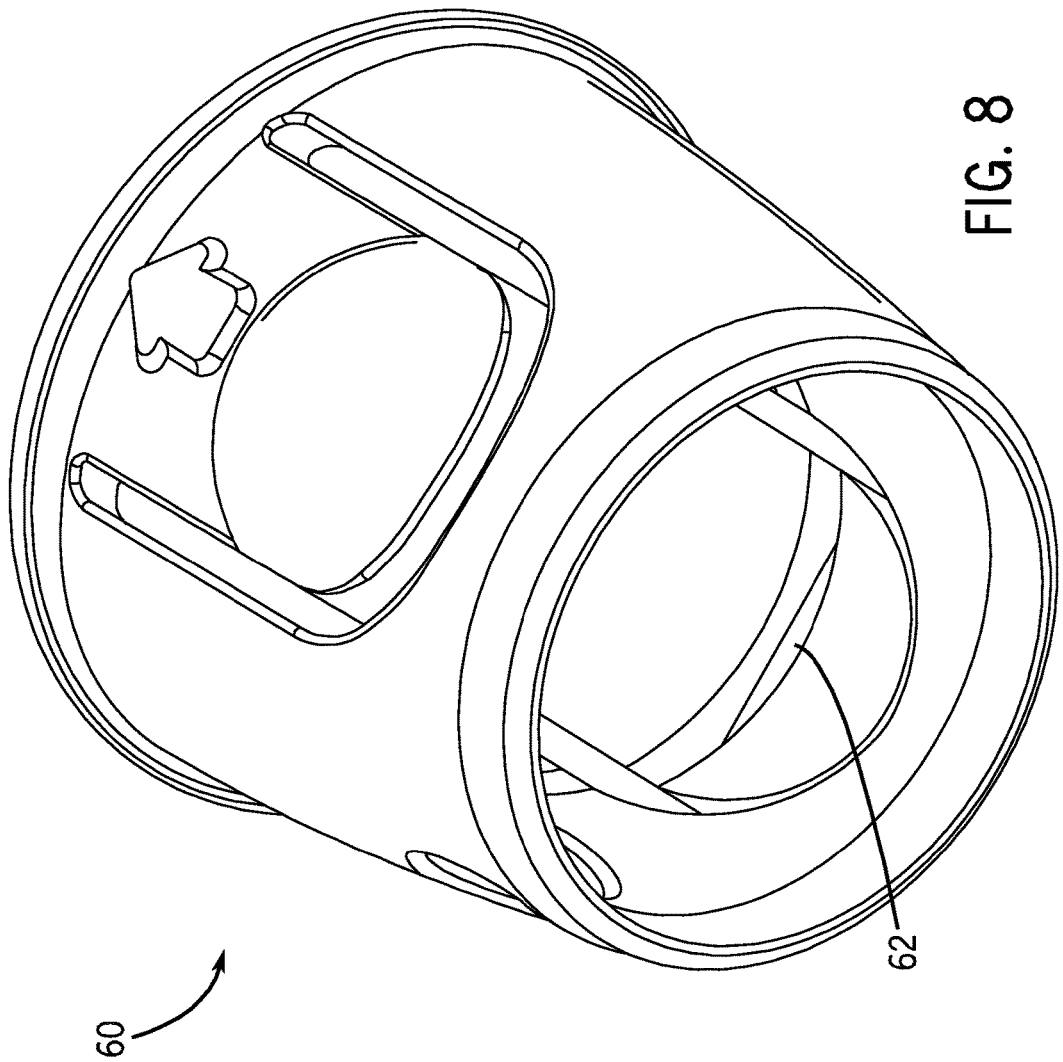
FIG. 8 is an isometric view of the bag cutter of FIG. 7 looking into the bag cutter from a perspective closest to the retainer.
Figure 9:
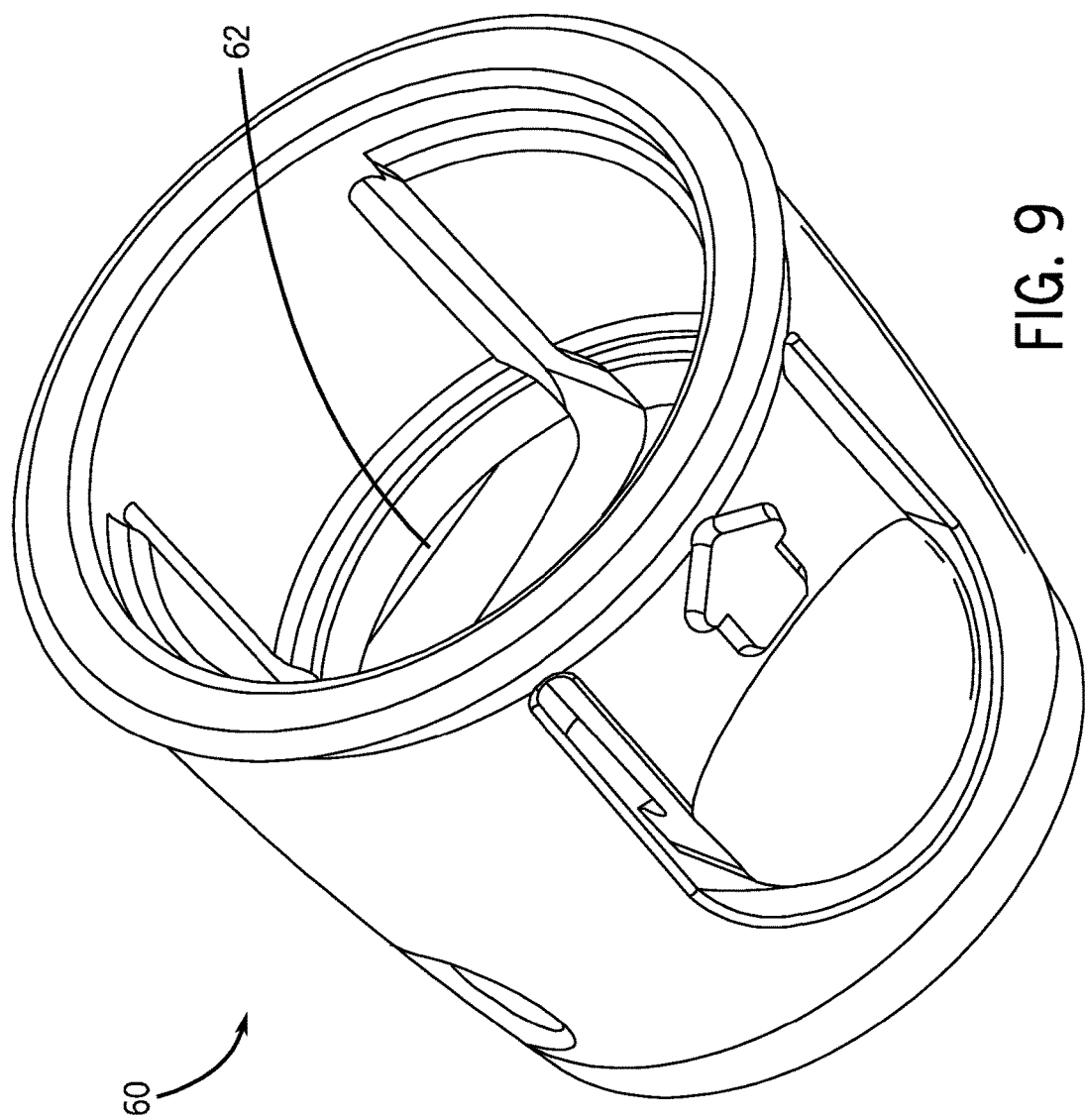
FIG. 9 is an isometric view of the bag cutter of FIG. 7 looking into the bag cutter from a perspective closest to the inner coupler.
Figure 10:
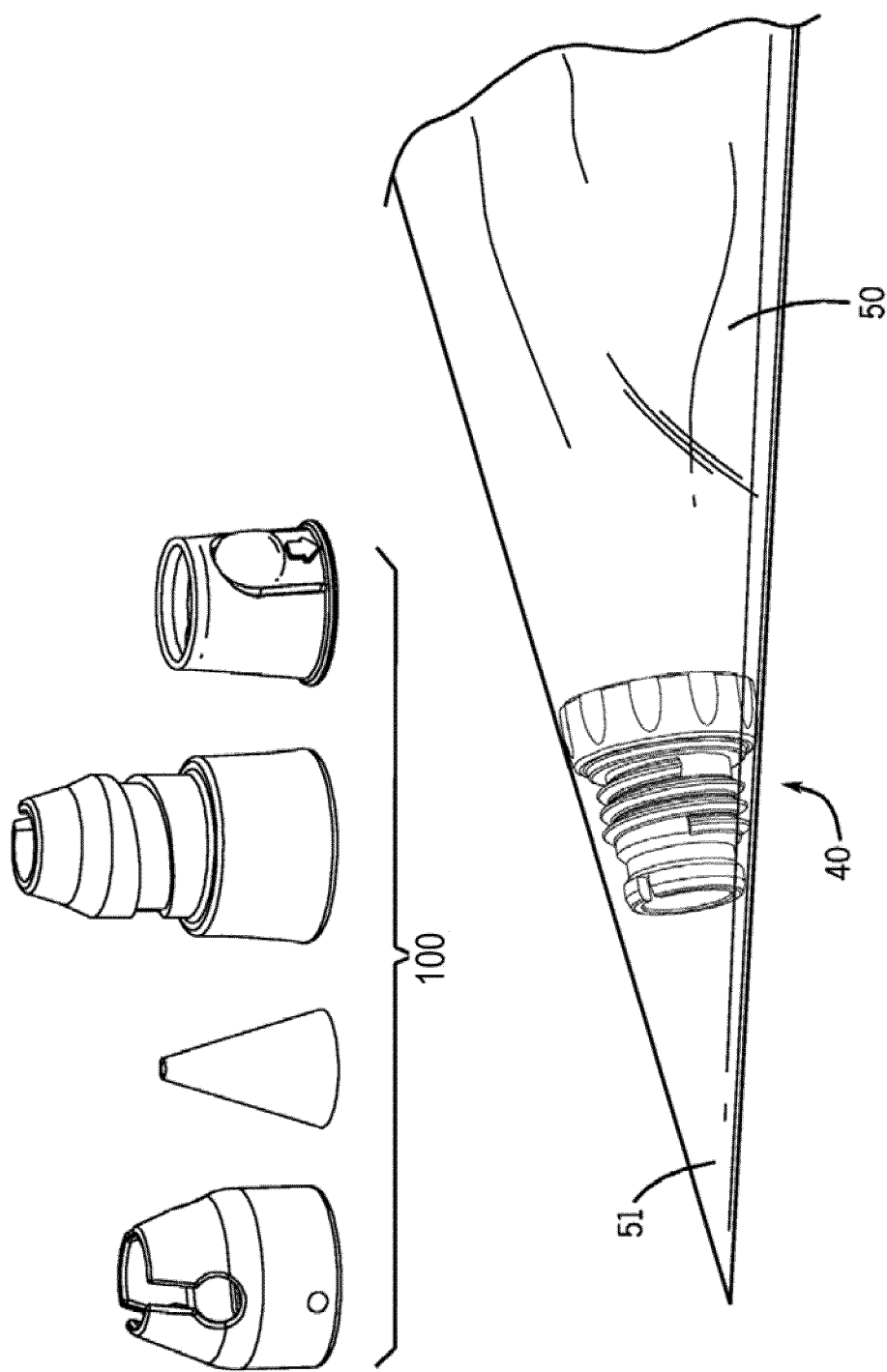
FIG. 10 is illustrates a first step of an exemplary process for cutting the decorating bag and assembling the coupler of FIG. 1.
Figure 11:
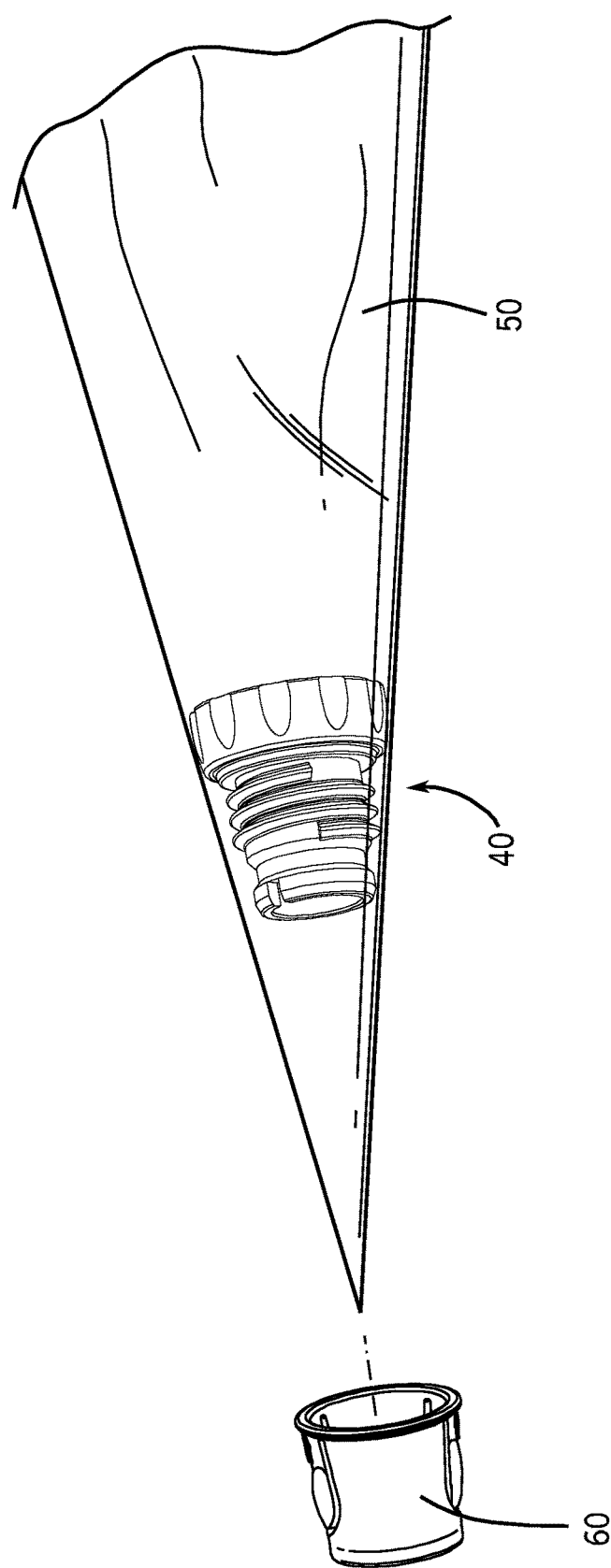
FIG. 11 illustrates a second step of the exemplary process for cutting the decorating bag and assembling the coupler of FIG. 1.
Figure 12:
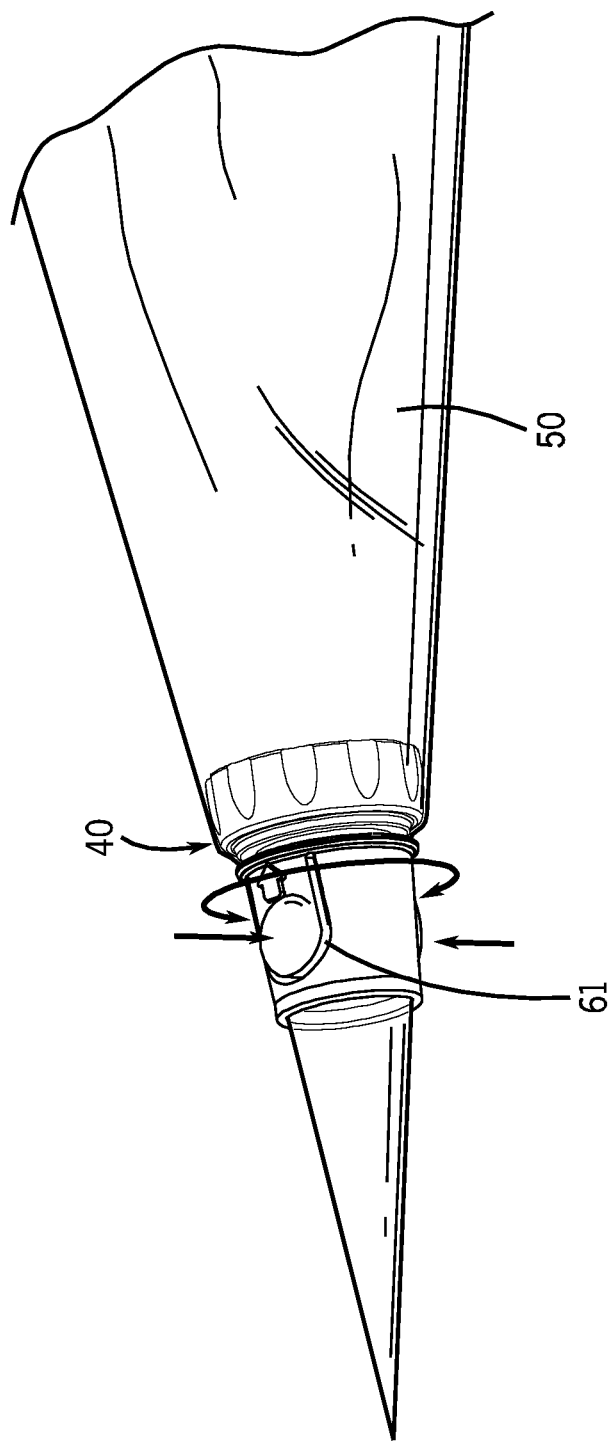
FIG. 12 illustrates a third step of the exemplary process for cutting the decorating bag and assembling the coupler of FIG. 1.
Figure 13:
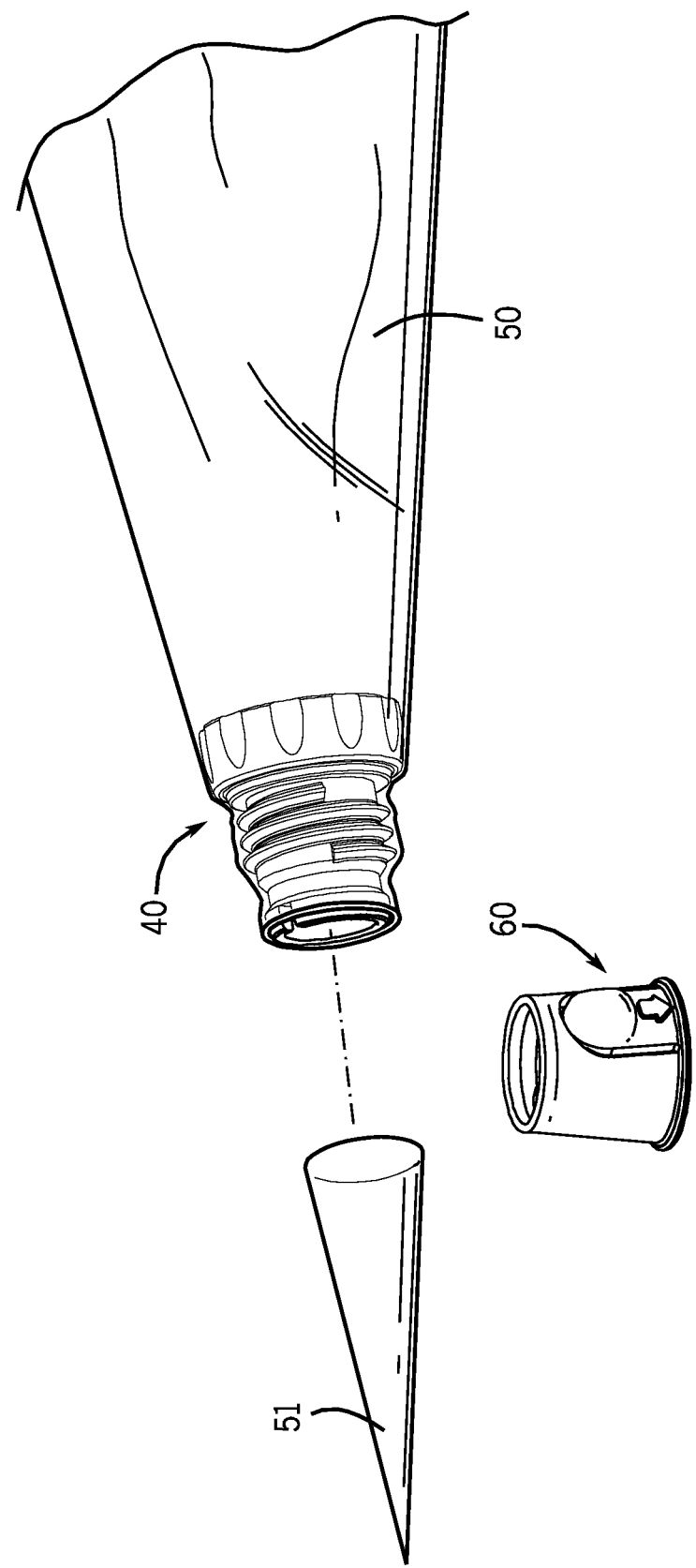
FIG. 13 illustrates a fourth step of the exemplary process for cutting the decorating bag and assembling the coupler of FIG. 1.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

As illustrated in FIGS. 1-20B, a coupler 100 comprises a retainer 10, an outer coupler 30 and an inner coupler 40. A decorating tip 20 may, in certain embodiments, be inserted into the retainer 10. The coupler 100 may be any color. In addition, the coupler 100 may be opaque or transparent. The coupler 100 is made of any suitable material, for example, plastic or metal.

Referring now to FIGS. 1-3B, the coupler 100 includes an inner coupler 40. The inner coupler 40 includes an inner coupler to outer coupler coupling mechanism, such as in the illustrated embodiment, large threads 41, a shoulder 42 and a base portion 44. The inner coupler to outer coupler coupling mechanism may be, for example, threading, bayonet mounting, or a snap-fit mounting. The base portion 44 may include grips 43. The inner coupler 40 is placed inside of a decorating bag 50 such that the base portion 44 is oriented to face an opening of the decorating bag 50 in which filling or icing is inserted (see FIGS. 10-11). The grips 43 assist the decorator in gripping the inner coupler 40 when the decorating bag 50 is disposed between the decorator and the inner coupler 40. One embodiment of the inner coupler 40 also includes a recessed groove 45 (see FIGS. 2A and 2B) that provides blade clearance, enabling a user to cut the decorating bag 50 with a decorating bag cutter 60 (described in further detail below) without cutting or otherwise damaging the inner coupler 40. The decorating bag 50 may be, for example, a featherweight or disposable plastic bag.

The coupler 100 also includes an outer coupler 30. The outer coupler includes in an interior, an outer coupler to inner coupler coupling mechanism that may be, for example, threading, bayonet mounting, or a snap-fit mounting, such as large threads 32 (see FIG. 5B) configured to interact with the large threads 41 of the inner coupler. In one embodiment, the threads are provided with about a 3 mm pitch with the outer coupler threading being about 1.65 inches deep and 1.81 inches wide and the inner coupler threading being about 1.95 inches deep and about 2.24 inches wide. The large threads 32 and 41 make it easier for the decorator to thread the outer coupler 30 and the inner coupler 40 together, even when a decorating bag 50 is disposed between the outer coupler 30 and the inner coupler 40. The large threads 32 and 41 also prevent the outer coupler 30 from cross threading the retainer 10 when the outer coupler 30 is threaded onto the decorating bag 50. The outer coupler includes in an exterior with an outer coupler to retainer coupling mechanism that may be, for example, threading, bayonet mounting, or a snap-fit mounting, such as a grooved portion 31 of a bayonet lock. The groove portion 31 corresponds to an extruded portion 34 (FIG. 6) on the retainer 10 to allow the retainer 10 to attach to and lock with the outer coupler 30 with a quarter turn. It should be appreciated that the location of the groove portion and the corresponding extruded portion may be switched.

The coupler 100 further includes the retainer 10. An interior of the retainer 10 includes an extruded portion (not illustrated) of a bayonet lock that corresponds to groove portion 31 of the outer coupler 30. The extruded portion of the retainer 10 and the groove portion 31 of the outer coupler 30 allow the retainer 10 to attach to and lock with the outer coupler 30 with a quarter turn.

In one embodiment, illustrated in FIGS. 2A, 3A and 4A, a retainer 10A includes a central opening 11 and a plurality of openings 12 on a side surface of the retainer 10A. Each opening 12 is disposed between two fingers 13. In a preferred embodiment, there are three openings 12, each opening evenly spaced from the two adjacent openings, and three fingers 13, each finger evenly spaced from the two adjacent fingers. The openings 12 and fingers 13 provide flexibility to the retainer 10A to allow for the use of different sizes and geometries of decorating tips 20. The openings 12 and fingers 13 provide the optimal stiffness to secure the decorating tip 20 in that the openings 12 allow the fingers 13 to flex in and out to receive a range of different sized or shaped tips. For example, when a larger decorating tip 20 is used, the fingers 13 flex outward. The number of openings 12 is the same as the number of fingers 13. Although three openings 12 and fingers 13 are preferred, any number of openings 12 and fingers 13 may be utilized. However, less than three openings 12 and fingers 13 may not be as effective in providing the optimal stiffness to secure the decorating tip 20.

The retainer 10A is configured to receive all standard sized decorating tips 20 through the central opening 11. The decorating tip may have a frustroconical portion that is seated on an upper portion of the outer coupler. For certain tips, such as standard sized tips 20, the decorating tip 20 is secured between the outer coupler 30 and the retainer 10. In one embodiment, the retainer 10 is removably securable with the outer coupler 30 and a decorating portion of the decorating tip 20 extending above the retainer 10. The decorating tip 20 is loaded into the retainer 10 from a bottom portion of the retainer 10 in a direction towards a top portion of the retainer 10 (e.g. in a direction away from outer coupler 30). After the decorating tip 20 is in place, the retainer 10 may attach to and lock with the outer coupler 30 with a quarter turn.

In another embodiment, illustrated in FIGS. 2B, 3B and 4B, a retainer 10B includes a central seal 14 at a top surface of the retainer 10B. The seal 14 allows the retainer 10B to serve as a cap to prevent an outflow of filling or icing when the decorating bag 50 is not in use. In other words, retainer 10B replaces retainer 10A when the decorating bag 50 is not in use. In a further embodiment, a tip 20 is provided that does not allow icing to exit, such as having a sealed end. Such a sealing tip may be used in conjunction with the retainer 10B to seal the decorating bag, such as to prevent drying of the icing container therein.

The coupler 100 is multi-functional depending on the decorating tip 20 selected. For example, the coupler 100 may serve as an icing dispenser when round tip 20A is selected (see FIG. 1, 16-17). In this example, round tip 20A is inserted into the retainer 10 and the retainer 10 is attached to the outer coupler 30 with a quarter turn.

Figures 18A, 18B:
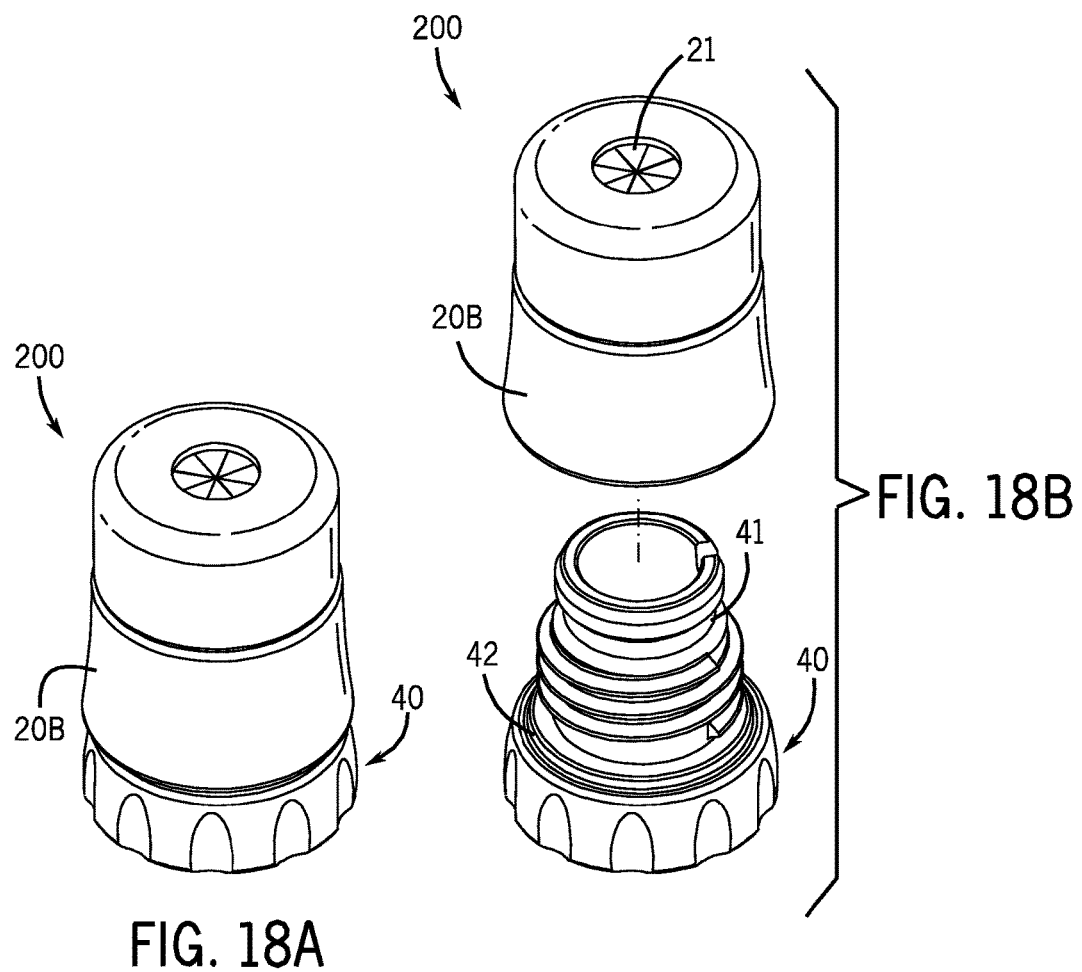
FIG. 18A is an isometric view another exemplary embodiment of a coupler for a decorating bag equipped with a batter dispensing tip.
FIG. 18B is an exploded view of the coupler of FIG. 18A.

In yet another example, a coupler 200 may serve as a batter dispenser when batter dispensing tip 20B is selected (see FIGS. 18A-18B). In this example, batter dispensing tip 20B includes a silicone valve 21 that stops drips, allowing the user to easily dispense batter into cups with no mess. The silicone valve 21 prevents batter from exiting the batter dispensing tip 20B unless the user applies a force to (e.g. squeezes) the decorating bag 50. An interior of batter dispensing tip 20B contains a threaded portion (not illustrated) configured to interact with the large threads 41 of the inner coupler. In other words, in this example, outer coupler 30 is not required as batter dispensing tip 20B threads directly onto inner coupler 40.

Figures 19A, 19B:
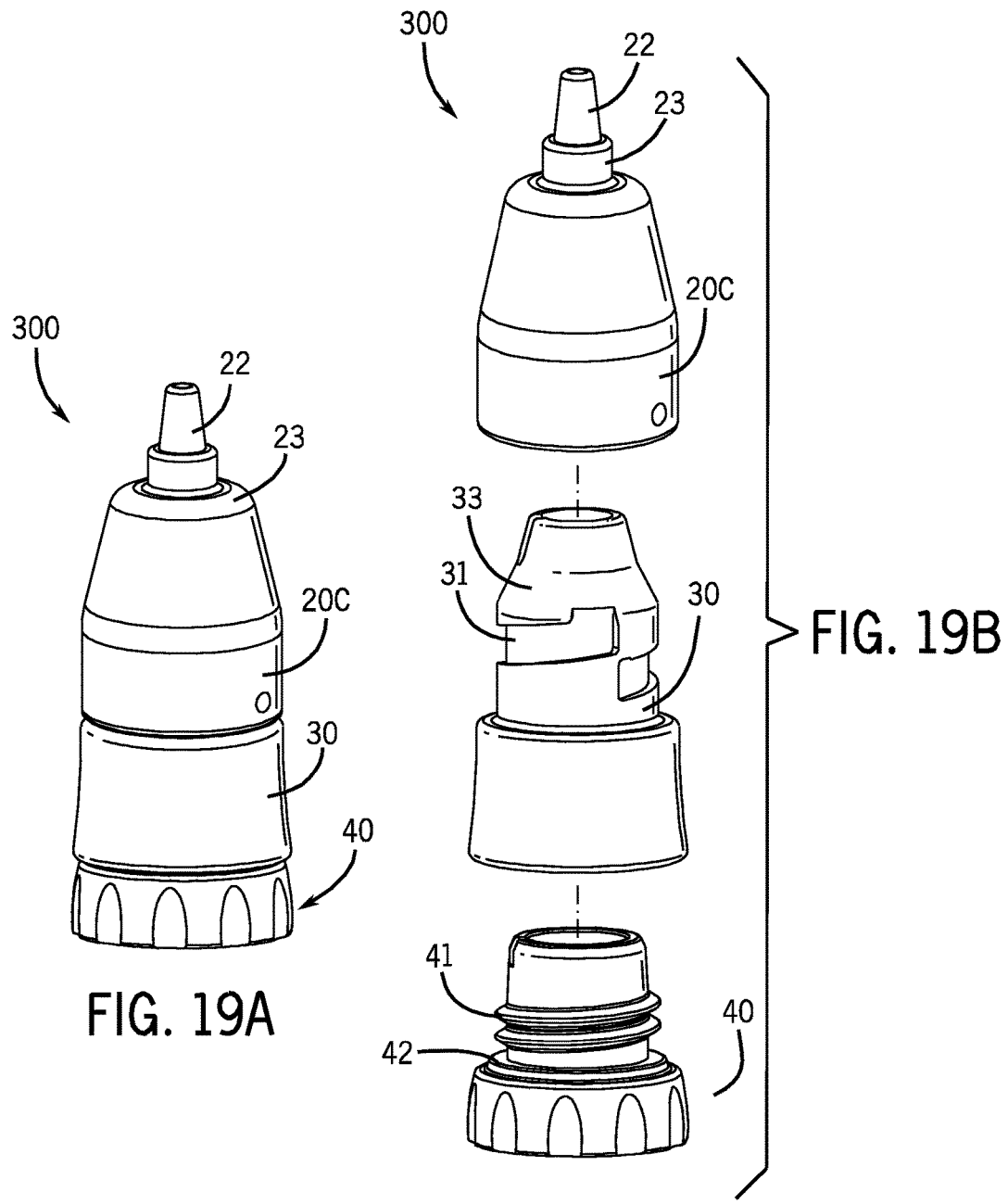
FIG. 19A is an isometric view another exemplary embodiment of a coupler for a decorating bag equipped with a cupcake filling tip.
FIG. 19B is an exploded view of the coupler of FIG. 19A.

In still another example, a coupler 300 may serve as cupcake filler when cupcake filling tip 20C is selected (see FIGS. 19A-19B). Cupcake filling tip 20C is a stepped tip including a first ridge 22 and a second ridge 23. First ridge 22 has a smaller diameter than second ridge 23. When using cupcake filling tip 20C, the user inserts cupcake filling tip 20C into a top, center portion of a cupcake as deep as the first ridge 22 for a standard size cupcake or as deep as the second ridge 23 for a jumbo or cake-size cupcake. The design of cupcake filling tip 20C allows the user to place the filling at a center of the cupcake without guessing the location of the tip. An interior of the cupcake filling tip 20C contains an extruded portion (not illustrated) corresponding to the groove portion 31 of the outer coupler 30. This allows cupcake filling tip 20C to attach to and lock with the outer coupler 30 with, in one embodiment, a quarter turn. In other words, in this example, retainer 10 is not required as cupcake filling tip 20C threads directly onto outer coupler 30. In addition, the interior of the cupcake filling tip 20C contains an annular ring (not illustrated) that contacts an angled portion 33 of the outer coupler 30 to provide both a sealing element to reduce icing blow by and a level of spring force that allows the outer coupler 30 to retain the cupcake filling tip 20C.

In another example, a coupler 400 may serve as an icing dispenser for creating ridges when fluted tip 20D is selected (see FIGS. 20A-20B). For example, fluted tip 20D may be used to create icing swirls on top of a baked good. The large fluted opening in fluted tip 20D delivers more icing than a conventional fluted tip and allows the decorator to create bigger swirls. An interior of the fluted tip 20D contains an extruded portion (not illustrated) corresponding to the groove portion 31 of the outer coupler 30. This allows fluted tip 20D to attach to and lock with the outer coupler 30 with, in one embodiment, a quarter turn. In other words, in this example, retainer 10 is not required as fluted tip 20D threads directly onto outer coupler 30. In addition, the interior of the fluted tip 20D contains an annular ring (not illustrated) that contacts an angled portion 33 of the outer coupler 30 to provide both a sealing element to reduce icing blow by and a level of spring force that allows the outer coupler 30 to retain the fluted tip 20D.

The exemplary embodiments describe above do not limit the types of decorating tips that may be used in the coupler. For example, other decorating tips that may be used in conjunction with coupler 100 include open or closed star tips, basketweave tips, ruffle tips, leaf tips, petal tips, multi-opening tips, drop flower tips, left-handed tips or any other specialty decorating tips. In one embodiment, the decorating tips 20 are metal decorating tips. In another embodiment, the decorating tips 20 are plastic decorating tips. In other embodiments, the decorating tips 20 may be made from any other suitable material.

A method of assembling the coupler 100 is described below. Referring now to FIGS. 7-13, the inner coupler 40 of the coupler 100 may be used in conjunction with a decorating bag cutter 60 to cut the decorating bag 50 at a desired location. When using a coupler with disposable decorating bags, it is necessary to cut a tip off the decorating bag in a correct location in order to allow the coupler to extend through. It should be appreciated that if the bag is cut too far from the tip, the opening will be too large to retain the inner coupler 40. If the bag is cut too close to the tip, the inner coupler 40 will not properly function because the opening from the bag will not allow the inner coupler 40 to be properly seated within the bag. In order to cut the decorating bag 50 at the desired location, inner coupler 40 of the coupler 100 is inserted into the decorating bag 50 such that the base portion 44 having grips 43 is oriented to face an opening of the decorating bag 50 in which filling or icing is inserted (see FIG. 10). In other words, the inner coupler 40 is inserted into the decorating bag 50 until a top portion of the inner coupler 40 is flush against a sealed tip 51 of the decorating bag 50. Next, the decorating bag cutter 60 is slid over the sealed tip 51 of the decorating bag 50 until the decorating bag cutter 60 is flush against the shoulder 42 of the inner coupler 40 (see FIGS. 11-12). Then, the user squeezes on blade tabs 61 of the decorating bag cutter 60 and rotates the decorating bag cutter 60 around an entire circumference of the sealed tip 51 of the decorating bag 50 while blade tabs 61 are still depressed (see FIG. 12). When the user squeezes on the blade tabs 61, at least one blade 62 (see FIGS. 8-9) contacts the decorating bag 50 and cuts off a tip 51 of the decorating bag 50 (see FIG. 13). In a preferred embodiment, the decorating bag cutter 60 includes two blades 62 oriented 180 degrees from each other. In the preferred embodiment, the decorating bag cutter 60 may only need to be rotated halfway (i.e. 180 degrees) around a sealed tip of the decorating bag 50, while the blade tab remains squeezed. The number of blades 62 will determine a degree of rotation around the sealed tip of the decorating bag 50 that the decorating bag cutter 60 must be rotated to remove the tip 51 from the decorating bag 50. The decorating bag cutter 60 cuts the decorating bag 50 to the correct length. The user removes the tip 51 by removing decorating bag cutter 60 and pulling tip 51 away from the decorating bag 50.

Figure 14:
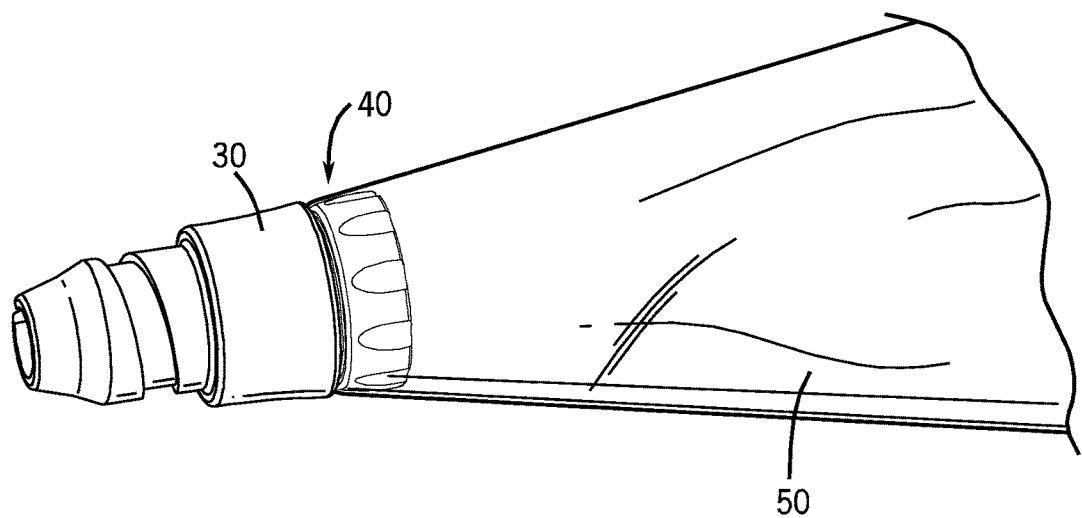
FIG. 14 illustrates a fifth step of the exemplary process for cutting the decorating bag and assembling the coupler of FIG. 1.
Figure 15:
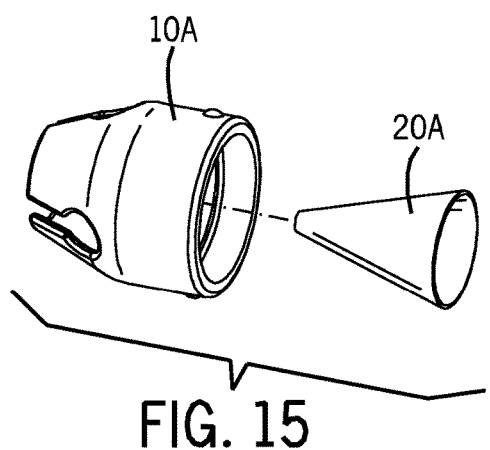
FIG. 15 illustrates a sixth step of the exemplary process for cutting the decorating bag and assembling the coupler of FIG. 1.
Figure 16:
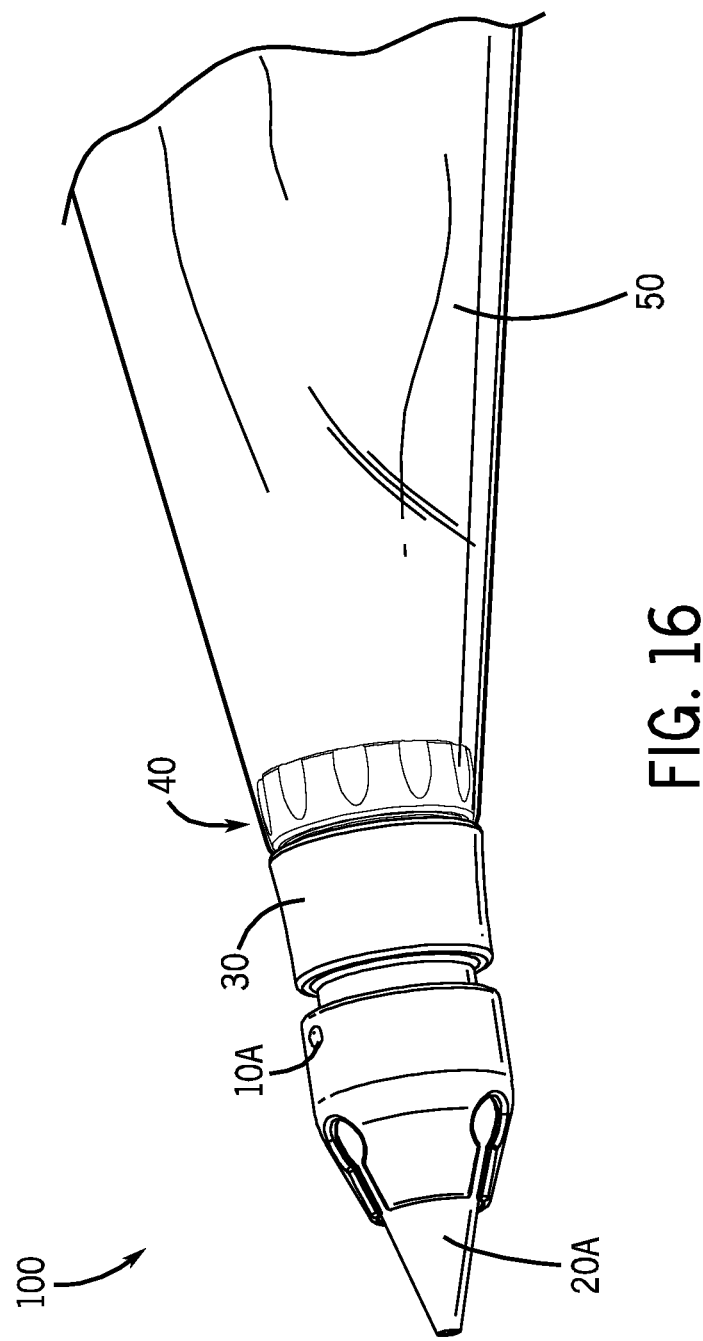
FIG. 16 illustrates a final step of the exemplary process for cutting the decorating bag and assembling the coupler of FIG. 1.
Figure 17:
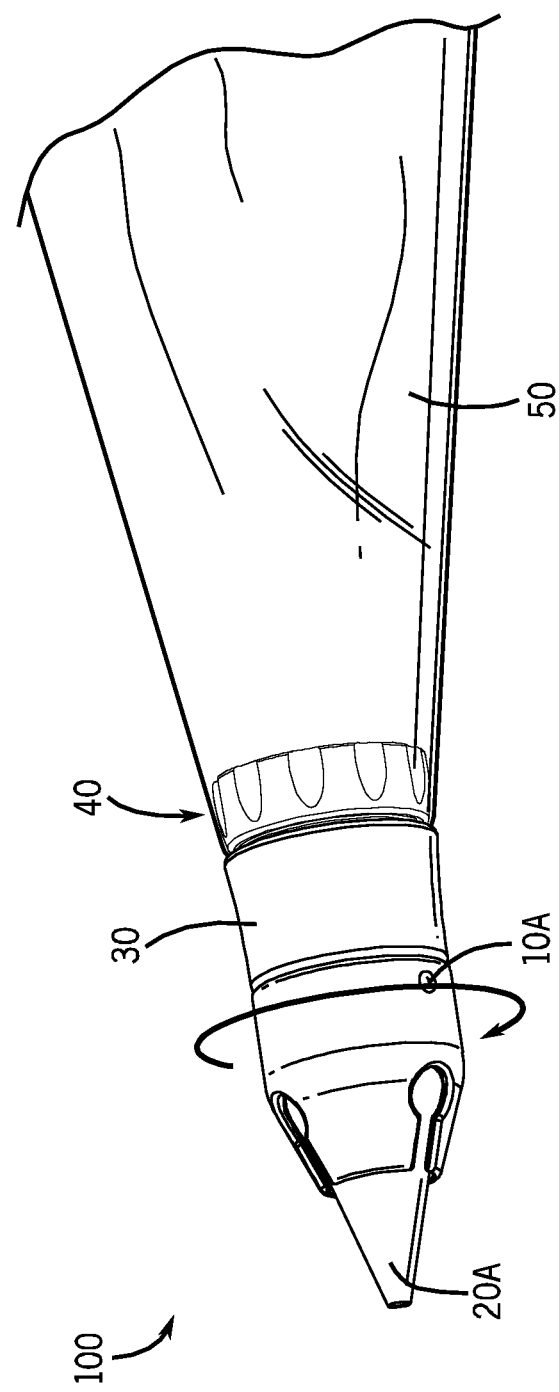
FIG. 17 illustrates an assembled coupler of FIG. 1.

After the tip 51 is removed, outer coupler 30 may be threaded over the decorating bag 50 onto the inner coupler 40 (see FIG. 14). A decorating tip 20, such as round tip 20A, may be inserted into the retainer 10A (see FIG. 15). The retainer 10A is installed on outer coupler 30 with a quarter turn to lock the retainer 10A and the round tip 20A in place (see FIG. 16). FIG. 17 illustrates the completed coupler 100 and decorating bag 50 assembly. The decorating bag 50 may then be filled with filling or icing and used to fill or decorate a baked good.

At any point during the filling or decorating process, the retainer 10A may be removed from outer coupler 30. The decorating tip 20 may be quickly and easily changed by removing the inserted decorating tip 20 (e.g. round tip 20A), inserting another decorating tip 20 (e.g. tips 20B-20D or any other standard sized decorating tip), and reinstalling retainer 10A on outer coupler 30 with a quarter turn. As described above, some decorating tips 20 do not require the retainer 10 and may be directly attached to either outer coupler 30 or inner coupler 40. When changing the decorating tip 20, the inner coupler 40 remains within the decorating bag 50 and attached to the outer coupler 30, even when the retainer 10 is removed. Thus, the coupler 100 allows the user to quickly and easily change decorating tip 20 without removing the coupler 100 from the decorating bag 50 or making a mess.

Alternatively, after retainer 10A is removed, retainer 10B may be installed on outer coupler 30 with a quarter turn in order to prevent the outflow of filling or icing when the decorating bag 50 is not in use.

When the filling or decorating process is complete, outer coupler 30 is unthreaded from inner coupler 40. The user may easily remove the inner coupler 40 from the decorating bag 50 by pushing the inner coupler 40 through the opening at the end of the decorating bag 50 where tip 51 was previously located. This allows for quick and easy cleanup.

The various types of tips 20 that have been described may be retained by a retainer 10 or may be directly securable to the outer coupler 30 by use of threading, bayonet type mounting, snap fit or the like.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A coupler removably connectable to a decorating bag, the coupler comprising:
   an inner coupler configured to be inserted into the decorating bag;
   an outer coupler configured to removably secure to the inner coupler with the decorating bag disposed between the inner coupler and the outer coupler; and
   a retainer configured to receive a decorating tip and removably secure to the outer coupler in order to retain the decorating tip in position,
   wherein the retainer includes a central opening and a plurality of fingers separated by a plurality of openings, each of the fingers being flexible towards and away from a longitudinal axis of the central opening to provide a predetermined stiffness to retain the decorating tip in position.

2. The coupler of claim 1, further comprising a bag cutter which is engageable with the inner coupler when the outer coupler is not secured to the inner coupler,
   wherein when the bag cutter is engaged with the inner coupler, the decorating bag is disposed between the bag cutter and the inner coupler to allow the bag cutter to cut an outer circumference of the decorating bag.

3. The coupler of claim 2, wherein the bag cutter includes one or more blade tabs that are movable towards and away from a longitudinal axis of the bag cutter, each of the one or more blade tabs including a blade extending from an inner surface thereof towards a longitudinal axis of the bag cutter.

4. The coupler of claim 3, wherein upon application of a force to the one or more blade tabs, a respective blade of the one or more blade tabs is engageable with the decorating bag to cut a portion of the decorating bag disposed between the bag cutter and the inner coupler.

5. The coupler of claim 1, further comprising a non-standard sized decorating tip directly removably securable to the outer coupler without the retainer.

6. The coupler of claim 5, wherein the non-standard sized decorating tip includes a valve that controllably seals the decorating bag, the valve configured to retain contents of the decorating bag and release the contents of the decorating bag upon application of a force to the decorating bag.

7. The coupler of claim 1,
   wherein an outer surface of the inner coupler engages with an inner surface of the outer coupler via threading, bayonet mounting, or a snap-fit mounting, and
   wherein an outer surface of the outer coupler engages with an inner surface of the retainer via threading, bayonet mounting, or a snap-fit mounting.

8. The coupler of claim 1, further comprising a sealing retainer configured to removably secure to the outer coupler when the retainer is not secured to the outer coupler, the sealing retainer having a sealed top surface to prevent an outflow of contents of the decorating bag when the sealing retainer is secured to the outer coupler.

9. A system for dispensing viscous material from a decorating bag comprising:
   a decorating bag;
   an inner coupler configured to be inserted into the decorating bag;
   an outer coupler configured to removably secure to the inner coupler with the decorating bag disposed between the inner coupler and the outer coupler;
   a decorating tip having a frustoconical portion;
   a retainer configured to receive the decorating tip and removably secure to the outer coupler in order to retain the decorating tip in position; wherein the retainer includes a central opening and a plurality of fingers separated by a plurality of openings, each of the fingers being flexible towards and away from a longitudinal axis of the central opening to provide a predetermined stiffness to retain the decorating tip in position,
   wherein when the retainer is secured to the outer coupler with the decorating tip secured therebetween, a portion of the decorating tip extends past an upper surface of the retainer.

10. The system of claim 9, further comprising a bag cutter which is engageable with the inner coupler when the outer coupler is not secured to the inner coupler,
    wherein when the bag cutter is engaged with the inner coupler, the decorating bag is disposed between the bag cutter and the inner coupler to allow the bag cutter to cut an outer circumference of the decorating bag.

11. The system of claim 10, wherein the bag cutter includes one or more blade tabs that are movable towards and away from a longitudinal axis of the bag cutter, each of the one or more blade tabs including a blade extending from an inner surface thereof towards a longitudinal axis of the bag cutter.

12. The system of claim 11, wherein upon application of a force to the one or more blade tabs, a respective blade of the one or more blade tabs is engageable with the decorating bag to cut a portion of the decorating bag disposed between the bag cutter and the inner coupler.

13. The system of claim 9, further comprising a non-standard sized decorating tip directly removably securable to the outer coupler without the retainer.

14. The system of claim 9,
    wherein an outer surface of the inner coupler engages with an inner surface of the outer coupler via threading, bayonet mounting, or a snap-fit mounting, and
    wherein an outer surface of the outer coupler engages with an inner surface of the retainer via threading, bayonet mounting, or a snap-fit mounting.

15. The system of claim 9, further comprising a sealing retainer configured to removably secure to the outer coupler when the retainer is not secured to the outer coupler, the sealing retainer having a sealed top surface to prevent an outflow of contents of the decorating bag when the sealing retainer is secured to the outer coupler.

16. A method for dispensing material from a decorating bag comprising:
inserting an inner coupler into a decorating bag until a top portion of the inner coupler is adjacent a sealed tip of the decorating bag;
sliding a bag cutter over the sealed tip of the decorating bag until a base of the bag cutter is adjacent a shoulder of the inner coupler, the decorating bag disposed between the inner coupler and the bag cutter;
squeezing at least one blade tab of the bag cutter;
at least partially rotating the bag cutter relative to the sealed tip of the decorating bag and the inner coupler while the blade tab remains squeezed, a blade of the bag cutter cutting the sealed tip of the decorating bag from a remainder of the bag; and
removing the bag cutter and the sealed tip from the decorating bag; and engaging an outer coupler with the inner coupler, a portion of the decorating bag disposed therebetween.

17. The method of claim 16, further comprising securing a decorating tip between the outer coupler and a retainer that engages with the outer coupler.

18. The method of claim 16, further comprising:
removing the retainer engaged with the outer coupler;
removing the decorating tip;
replacing the decorating tip with another decorating tip; and
re-engaging the retainer with the outer coupler,
wherein during replacement of the decorating tip, the outer coupler and the inner coupler remain engaged with the portion of the decorating bag disposed therebetween.

* * * * *